(12) United States Patent
Ikeda et al.

(10) Patent No.: US 12,394,784 B2
(45) Date of Patent: Aug. 19, 2025

(54) SECONDARY BATTERY ELECTRODE, SOLID-STATE BATTERY INCLUDING THE SAME, AND SECONDARY BATTERY ELECTRODE MANUFACTURING METHOD

(71) Applicant: HONDA MOTOR CO., LTD., Tokyo (JP)

(72) Inventors: Shuga Ikeda, Saitama (JP); Shohei Yoshida, Saitama (JP); Satoshi Yonezawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 565 days.

(21) Appl. No.: 17/661,750

(22) Filed: May 3, 2022

(65) Prior Publication Data
US 2022/0359863 A1   Nov. 10, 2022

(30) Foreign Application Priority Data

May 6, 2021   (JP) ................. 2021-078312

(51) Int. Cl.
*H01M 4/36*   (2006.01)
*H01M 4/04*   (2006.01)
(Continued)

(52) U.S. Cl.
CPC ......... *H01M 4/366* (2013.01); *H01M 4/0404* (2013.01); *H01M 10/0525* (2013.01);
(Continued)

(58) Field of Classification Search
CPC ....... H01M 10/0525; H01M 2004/021; H01M 4/0402; H01M 4/0404; H01M 4/139;
(Continued)

(56) References Cited

U.S. PATENT DOCUMENTS

| 6,051,338 A | 4/2000 | Miyazaki et al. |
| 2018/0013173 A1 | 1/2018 | Kawada et al. |

(Continued)

FOREIGN PATENT DOCUMENTS

| CN | 108390066 A | 8/2018 |
| CN | 110875492 A | 3/2020 |

(Continued)

OTHER PUBLICATIONS

Machine translation JP2011192539A (Year: 2011).*
(Continued)

*Primary Examiner* — Victoria H Lynch
(74) *Attorney, Agent, or Firm* — CKC & Partners Co., LLC

(57) ABSTRACT

Provided is a secondary battery electrode having a sufficient peel strength between a base material and a material mixture layer without the need for increasing a binder addition amount. A secondary battery electrode includes a base material and a material mixture layer made of an electrode material mixture containing an active material and a binder. The material mixture layer has a multilayer structure of at least two or more layers stacked on the base material. In the multilayer structure of the material mixture layer, a first material mixture layer stacked on a surface of the base material has a higher contained binder concentration than those of other material mixture layers. The thickness of the first material mixture layer is preferably equal to or less than the total thickness of the other material mixture layers.

1 Claim, 4 Drawing Sheets a. FIRST COATING STEP b. FIRST DRYING STEP c. SECOND COATING STEP d. SECOND DRYING STEP (51) Int. Cl.
*H01M 10/0525* (2010.01)
*H01M 4/02* (2006.01)
*H01M 4/58* (2010.01)
*H01M 4/583* (2010.01)
*H01M 4/62* (2006.01)
*H01M 4/66* (2006.01)

(52) U.S. Cl.
CPC .... *H01M 2004/021* (2013.01); *H01M 4/5815* (2013.01); *H01M 4/583* (2013.01); *H01M 4/622* (2013.01); *H01M 4/666* (2013.01)

(58) Field of Classification Search
CPC .... H01M 4/366; H01M 4/5815; H01M 4/583; H01M 4/622; H01M 4/666; Y02P 70/50; Y02E 60/10
See application file for complete search history.

(56) References Cited

U.S. PATENT DOCUMENTS

| 2018/0226681 A1 | 8/2018 | Hasegawa et al. |
| 2020/0075958 A1 | 3/2020 | Uchida et al. |

FOREIGN PATENT DOCUMENTS

| JP | H07161346 A | 6/1995 |
| JP | H1064526 A | 3/1998 |
| JP | H10270013 A | 10/1998 |
| JP | 2008258055 A | 10/2008 |
| JP | 2011192539 A | 9/2011 |
| JP | 2012256446 A | 12/2012 |
| JP | 2014199714 A | 10/2014 |
| JP | 2018125260 A | 8/2018 |
| WO | 2016116971 A1 | 7/2016 |

OTHER PUBLICATIONS

Machine translation JP2012256446A (Year: 2012).*
Decision of Refusal issued in the JP Patent Application No. 2021-078312, mailed on Feb. 21, 2023.
Office Action issued Mar. 24, 2025 in the CN Patent Application No. 202210455847.3.

* cited by examiner

SECONDARY BATTERY ELECTRODE, SOLID-STATE BATTERY INCLUDING THE SAME, AND SECONDARY BATTERY ELECTRODE MANUFACTURING METHOD

This application is based on and claims the benefit of priority from Japanese Patent Application No. 2021-078312, filed on 6 May 2021, the content of which is incorporated herein by reference.

BACKGROUND OF THE INVENTION

Field of the Invention

The present invention relates to a secondary battery electrode, a solid-state battery including the secondary battery electrode, and a secondary battery electrode manufacturing method.

Related Art

Typically, a secondary battery such as a lithium ion secondary battery has been widely used as a secondary battery having a high energy density. A liquid secondary battery has a cell structure in which a separator is present between a positive electrode and a negative electrode and the liquid secondary battery is filled with an electrolyte (an electrolytic solution) in the form of a liquid. In the case of an all-solid-state battery using a solid electrolyte, such a battery has a cell structure in which the solid electrolyte is present between a positive electrode and a negative electrode. The stack of a plurality of cells as described above forms the secondary battery.

The method for manufacturing the secondary battery electrode includes, for example, a method in which a base material made of, e.g., metal foil is used as a current collector, and an electrode material mixture containing an electrode active material and having a high viscosity is dried by heating after the base material has been coated with the electrode material mixture (see, e.g., Japanese Unexamined Patent Application, Publication No. H10-64526).

Patent Document 1: Japanese Unexamined Patent Application, Publication No. H10-64526

SUMMARY OF THE INVENTION

For improving adhesion between the base material and the electrode material mixture layer, the electrode material mixture contains, as a binder, a resin binder in the technique disclosed in Japanese Unexamined Patent Application, Publication No. H10-64526. However, in the course of drying the electrode material mixture layer by heating, the binder separates from an interface with the base material, and is segregated to the vicinity of a surface of the electrode material mixture layer. This leads to a problem that a sufficient peel strength between the electrode material mixture layer and the base material cannot be obtained. In the case of the insufficient peel strength, delamination occurs due to, e.g., a volume change during a manufacturing process or charging/discharging, and for this reason, the internal resistance of the battery increases. If a binder addition amount is merely increased for solving the above-described problems, there is a problem that the internal resistance of the battery increases due to the binder and a battery output decreases accordingly.

The present invention has been made in view of the above-described problems, and an object of the present invention is to provide a secondary battery electrode having a sufficient peel strength between a base material and a material mixture layer without the need for increasing a binder addition amount.

(1) The present invention relates to a secondary battery electrode including a base material and a material mixture layer made of an electrode material mixture containing an active material and a binder, the material mixture layer having a multilayer structure of at least two or more layers, the at least two or more layers being stacked on the base material and a first material mixture layer stacked on a surface of the base material having a higher contained binder concentration than those of other material mixture layers in the multilayer structure of the material mixture layer.

According to the aspect (1), a secondary battery electrode having a sufficient peel strength between a base material and a material mixture layer without the need for increasing a binder addition amount can be provided.

(2) The secondary battery electrode according to (1), in which the thickness of the first material mixture layer is equal to or less than the total thickness of the other material mixture layers.

According to the aspect (2), the peel strength between the base material and the material mixture layer can be improved, and a binder amount across the entire material mixture layer can be reduced.

(3) The secondary battery electrode according to (2), in which the multilayer structure is a double layer structure and the contained binder concentration of the first material mixture layer is higher than the contained binder concentration of a second material mixture layer stacked on an outermost side of the material mixture layer.

According to the aspect (3), the peel strength between the base material and the material mixture layer can be further improved.

(4) A solid-state battery including a positive electrode and a negative electrode, at least any of the positive electrode and the negative electrode being the secondary battery electrode according to any one of (1) to (3); and a solid electrolyte layer provided between the positive electrode and the negative electrode.

According to the aspect (4), a solid-state battery using a secondary battery electrode having a sufficient peel strength between a base material and a material mixture layer can be provided.

(5) The solid-state battery according to (4), further including the second material mixture layer stacked on the outermost side of the material mixture layer of the secondary battery electrode, the second material mixture layer containing a solid electrolyte at least in the vicinity of a surface contacting the solid electrolyte layer.

According to the aspect (5), a preferred peel strength between the material mixture layer and the solid electrolyte layer is obtained.

(6) The present invention relates to the method for manufacturing a secondary battery electrode, the method including a first coating step of coating a surface of a base material with a first material mixture layer made of an electrode material mixture containing an active material and a binder, a first drying step of drying the first material mixture layer by heating, the second coating step of coating a surface of the first material mixture layer with a second material mixture layer made of an electrode material mixture containing an active material and a binder, and the second drying step of drying the second material mixture layer by heating and the contained binder concentration of the first material mixture layer being higher than the contained binder concentration of the second material mixture layer.

According to the aspect (6), a secondary battery electrode having a sufficient peel, strength between a base material and a material mixture layer without the need for increasing a binder addition amount can be manufactured.

(7) The method for manufacturing the secondary battery electrode according to (6), in which in the first coating step and the second coating step, coating is performed such that the thickness of the first material mixture layer is equal to or less than the thickness of the second material mixture layer.

According to the aspect (7), a secondary battery electrode having an improved peel strength between a base material and a material mixture layer and having a reduced binder amount across the entire material mixture layer can be manufactured.

DETAILED DESCRIPTION OF THE INVENTION

Hereinafter, one embodiment of the present invention will be described with reference to the drawings. The present invention is not limited to the following embodiment, and changes can be made as necessary within the scope of the object of the present invention.

<Solid-State Battery>

Figure 1:
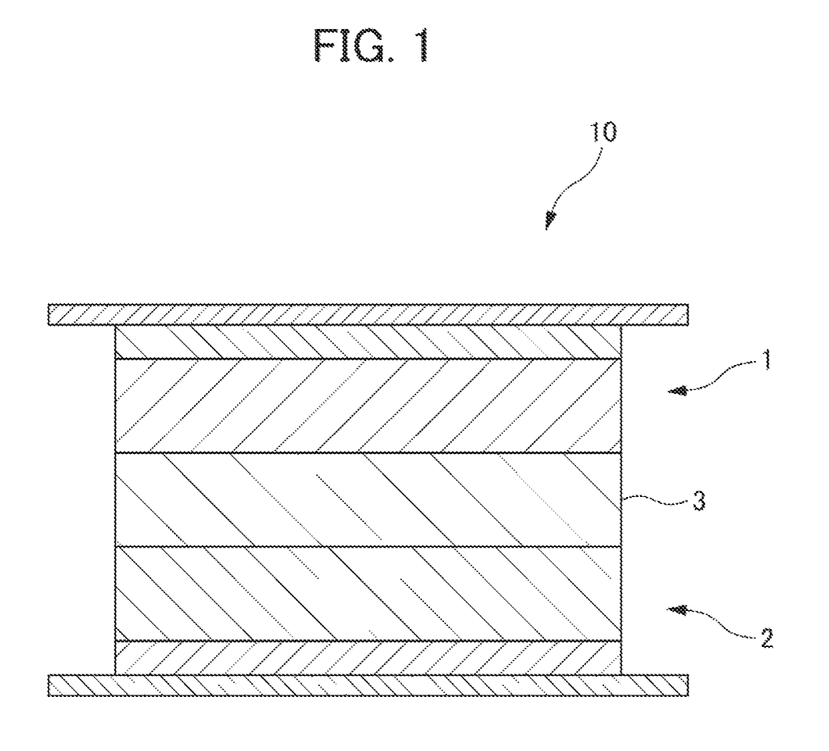
FIG. 1 is a sectional view showing the outline of a solid-state battery cell according to an embodiment of the present invention.

FIG. 1 is a sectional view showing a multilayer structure of a solid-state battery 10 according to the present embodiment. The solid-state battery 10 is one example of a secondary battery to which a secondary battery electrode according to the present embodiment is applicable, and the secondary battery electrode according to the present embodiment can be used not only as an electrode for a solid-state battery but also as an electrode for a liquid secondary battery having an electrolyte (an electrolytic solution) in the form of a liquid. As shown in FIG. 1, the solid-state battery 10 has a multilayer structure in which a negative electrode 1, a solid electrolyte layer 3, and a positive electrode 2 are stacked in this order. A plurality of multilayer structures as described above may be repeatedly provided.

<Secondary Battery Electrode>

The negative electrode 1 will be described below as an example of the secondary battery electrode with reference to FIGS. 2 to 4, but a similar configuration is also applicable to the positive electrode 2, except for configurations described below as different configuration examples. The configuration of the secondary battery electrode described below may be applied to the solid-state battery 10 or both of a negative electrode 1 and a positive electrode 2 of another secondary battery, or may be applied to the solid-state battery 10 or either one of a negative electrode 1 or a positive electrode 2 of another secondary battery.

[Negative Electrode and Positive Electrode]

Figure 2:
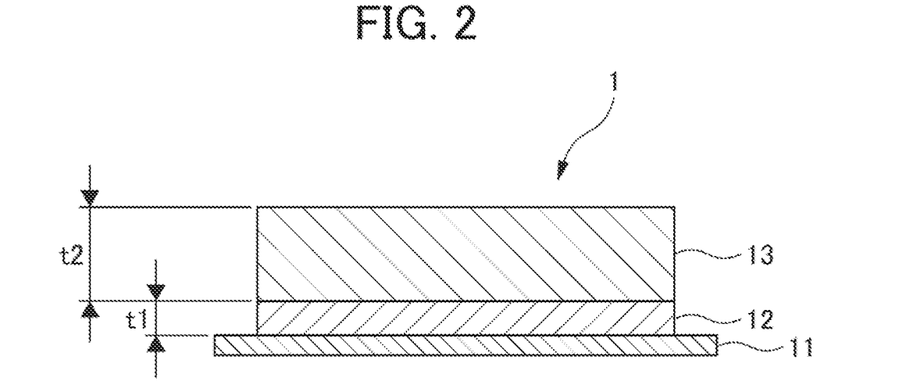
FIG. 2 is a sectional view showing the outline of a secondary battery electrode according to the embodiment of the present invention.

As shown in FIG. 2, the negative electrode 1 has a base material 11 as a current collector and a material mixture layer having a multilayer structure of first and second material mixture layers 12, 13 coating the base material 11. In the present embodiment, the material mixture layer having the multilayer structure has a double layer structure of the first material mixture layer 12 and the second material mixture layer 13, but may have a multilayer structure of three or more layers. The positive electrode 2 also has a configuration similar to that of the negative electrode 1 as described above.

(Base Material)

The base material 11 as the current collector is not particularly limited, and for example, well-known configurations of electrode current collectors made of metal foil such as nickel, aluminum, stainless steel, titanium, copper, and silver are applicable. Note that the above-described metal foil may be at least partially covered with a carbon material such as carbon paste.

(Material Mixture Layer)

Each of the first material mixture layer 12 and the second material mixture layer 13 is a layer made of an electrode material mixture containing at least an active material and a binder. The first material mixture layer 12 is a material mixture layer stacked on a surface of the base material 11, and the second material mixture layer 13 is a material mixture layer stacked on an outermost side of the material mixture layer having the multilayer structure.

The negative electrode active material used for the negative electrode 1 is not particularly limited, and in a case where the negative electrode 1 is used for, e.g., a lithium ion secondary battery, a well-known negative electrode active material capable of absorbing/releasing a lithium ion can be used. Examples of the negative electrode active material include metallic lithium, lithium alloy, metal oxide, metal sulfide, metal nitride, Si, SiO, and carbon materials such as black lead, hard carbon, and soft carbon, etc.

The positive electrode active material used for the positive electrode 2 is not particularly limited, and in a case where the positive electrode 2 is used for, e.g., a lithium ion secondary battery, examples of the positive electrode active material include transition metal chalcogenides such as titanium disulfide, molybdenum disulfide, and niobium selenide, transition metal oxides such as lithium nickel oxide ($LiNiO_2$), lithium manganese oxide ($LiMnO_2$, $LiMn_2O_4$), and lithium cobalt oxide ($LiCoO_2$), etc.

Examples of the binder used for the negative electrode 1 include sodium carboxymethyl cellulose, styrene-butadiene rubber, sodium polyacrylate, etc. Examples of the binder used for the positive electrode 2 include polyvinylidene fluoride, etc.

The material mixture layer including the first material mixture layer 12 and the second material mixture layer 13 may contain components other than those described above. The components other than those described above include, but are not limited to, a solid electrolyte and a conductive aid, for example. The solid electrolyte includes a solid electrolyte contained in the later-described solid electrolyte layer 3. The conductive aid is not particularly limited, and well-known conductive aids used for secondary battery electrodes, such as acetylene black, are applicable. The second material mixture layer 13 joined in contact with the solid electrolyte layer 3 preferably contains the solid electrolyte. With this configuration, binding force between the solid electrolyte contained in the second material mixture layer 13 and the solid electrolyte contained in the solid electrolyte layer 3 can improve a peel strength between the second material mixture layer 13 and the solid electrolyte layer 3.

The contained binder concentration of the first material mixture layer 12 is higher than the contained binder concentration of the second material mixture layer 13. In a case where the material mixture layer has a multilayer structure of three or more layers, the contained binder concentration of the first material mixture layer 12 is higher than the contained binder concentration of any of the other material mixture layers. With this configuration, a peel strength between the first material mixture layer 12 and the base material 11 can be improved, and the binder content of the entire material mixture layer can be reduced. Thus, a preferred peel strength of the material mixture layer and reduction in the internal resistance of the secondary battery due to reduction in a binder amount can be both achieved.

The contained binder concentration of the first material mixture layer 12 is higher than the contained binder concentration of the second material mixture layer 13, and as a result, the contained binder concentration of the second material mixture layer 13 can be reduced. Moreover, the first material mixture layer 12 and the second material mixture layer 13 are layers formed separately, and therefore, segregation (migration) to a binder surface upon material mixture layer formation can be reduced. Accordingly, the peel strength between the second material mixture layer 13 and the solid electrolyte layer 3 can be improved as described below.

Figure 3:
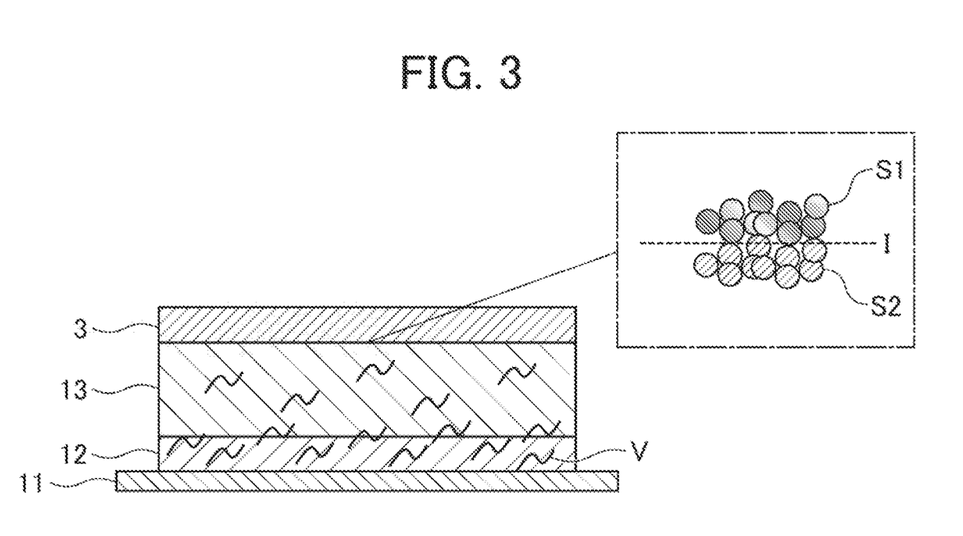
FIG. 3 is a sectional view showing the outline of the secondary battery electrode according to the embodiment of the present invention.

FIG. 3 is a conceptual diagram showing a state in which the solid electrolyte layer 3 is stacked on a surface of the second material mixture layer 13. As shown in FIG. 3, it is assumed that chemical or physical binding force acts between a solid electrolyte S1 contained in the solid electrolyte layer 3 and a solid electrolyte S2 contained in the second material mixture layer 13 in the vicinity of an interface I between the second material mixture layer 13 and the solid electrolyte layer 3, and accordingly, the peel strength between the second material mixture layer 13 and the solid electrolyte layer 3 is improved. In this state, in a case where a binder V contained in the second material mixture layer 13 is present in the vicinity of the interface I, the binder V interferes with binding between the solid electrolyte S1 and the solid electrolyte S2, and for this reason, there is a probability that the peel strength between the second material mixture layer 13 and the solid electrolyte layer 3 is degraded. However, the second material mixture layer 13 is the layer having a lower contained binder concentration and formed separately from the first material mixture layer 12, and therefore, the amount of binder V present in the vicinity of the interface I can be reduced. Thus, a preferred peel strength between the second material mixture layer 13 and the solid electrolyte layer 3 is obtained.

As shown in FIG. 2, the thickness t1 of the first material mixture layer 12 is preferably equal to or less than the thickness t2 of the second material mixture layer 13. If the material mixture layer has the multilayer structure of three or more layers, the thickness of the first material mixture layer 12 is preferably equal to or less than the total thickness of the other material mixture layers. With this configuration, the time for drying the first material mixture layer 12 containing a large amount of binder can be shortened, and binder migration in the first material mixture layer 12 can be reduced. Thus, the binder tends to remain in the vicinity of the interface between the first material mixture layer 12 and the base material 11. Thus, the peel strength between the first material mixture layer 12 and the base material 11 can be further improved. Moreover, it is assumed that no peeling in the material mixture layer occurs. In addition to above, the binder amount across the entire material mixture layer can be reduced, and therefore, the internal resistance of the secondary battery can be reduced.

[Solid Electrolyte Layer]

The solid electrolyte layer 3 is stacked between the negative electrode 1 and the positive electrode 2, and for example, is formed in a layer shape. The solid electrolyte layer 3 is a layer containing at least the solid electrolyte material. Charge transfer between the positive electrode active material and the negative electrode active material can be performed through the above-described solid electrolyte material. Note that in a case where the secondary battery electrode according to the present embodiment is applied to a battery including an electrolyte in the form of a liquid, the electrolytic solution is not particularly limited, and a well-known electrolytic solution used for a lithium ion secondary battery is applicable.

The solid electrolyte forming the solid electrolyte layer 3 is not particularly limited, and examples of the solid electrolyte include a sulfide-based solid electrolyte material, an oxide-based solid electrolyte material, a nitride-based solid electrolyte material, a halide-based solid electrolyte material, etc. In the case of a lithium ion battery, examples of the sulfide-based solid electrolyte material include LPS-halogen (Cl, Br, I), $Li_2S$—$P_2S_6$, $Li_2S$—$P_2S_5$—LiI, etc. Note that "$Li_2S$—$P_2S_5$" described above means a sulfide-based solid electrolyte material made using a raw material composition containing $Li_2S$ and $P_2S_5$, and the same also applies to other descriptions. In the case of a lithium ion battery, examples of the oxide-based solid electrolyte material include NASICON oxides, garnet oxides, perovskite oxides, etc. Examples of the NASICON oxides include oxides (e.g., $Li_{1.5}Al_{0.5}Ti_{1.5}(PO_4)_3$) containing Li, Al, Ti, P, and O. Examples of the garnet oxides include oxides (e.g., $Li_7La_3Zr_2O_{12}$) containing Li, La, Zr, and O. Examples of the perovskite oxides include oxides (e.g., $LiLaTiO_3$) containing Li, La, Ti, and O.

<Method for Manufacturing Secondary Battery Electrode>

Figure 4:
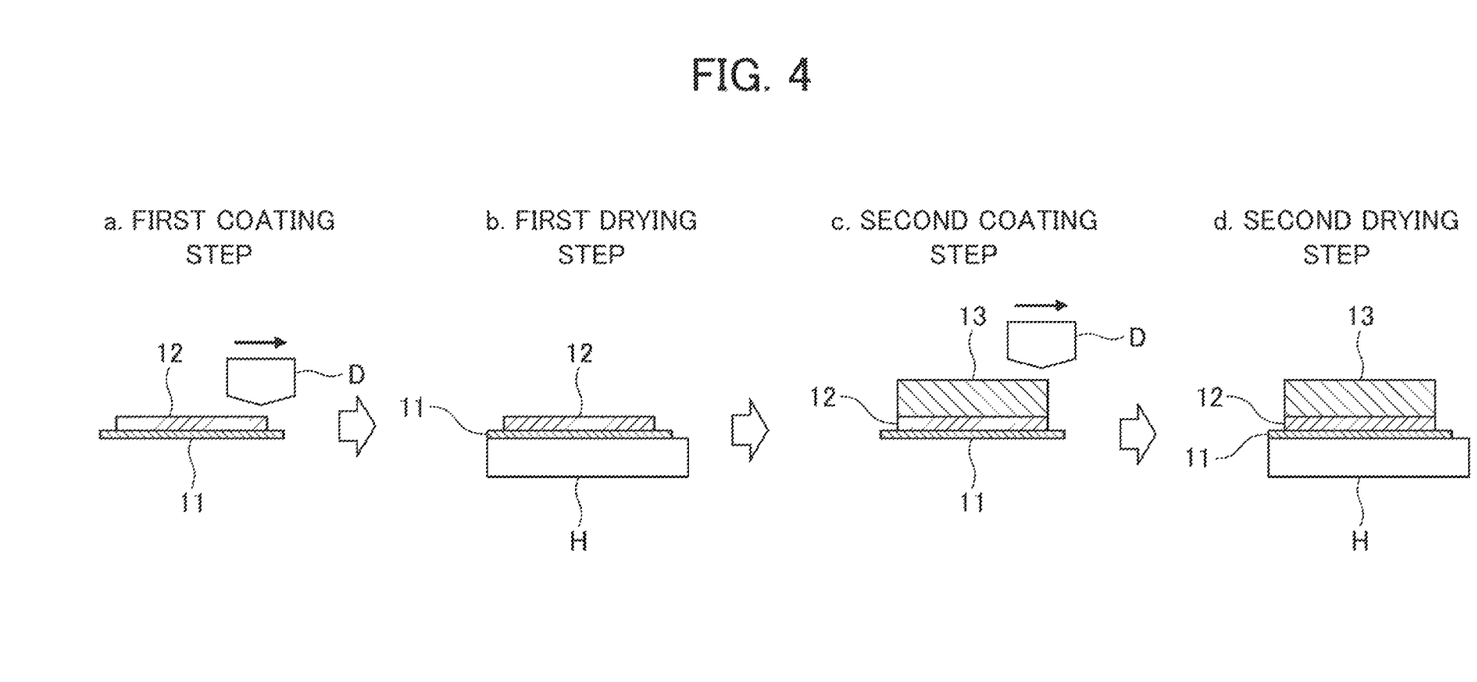
FIG. 4 is a view showing the steps of manufacturing the secondary battery electrode according to the embodiment of the present invention.

As shown in FIG. 4, the method for manufacturing the secondary battery electrode according to the present embodiment includes a first coating step, a first drying step, a second coating step, and a second drying step in this order. The first coating step and the first drying step are the steps of forming the first material mixture layer 12, and the second coating step and the second drying step are the steps of forming the second material mixture layer 13. In the case of forming, on the base material 11, the material mixture layer having the multilayer structure of three or more layers, the steps of forming material mixture layers other than those described above may be provided.

[First Coating Step]

The first coating step is the step of coating the base material 11 with the first material mixture layer 12. The contained binder concentration of the first material mixture layer 12 is higher than the contained binder concentration of the second material mixture layer 13. In a case where the material mixture layer has the multilayer structure of three or more layers, the contained binder concentration of the first material mixture layer 12 is preferably higher than the contained binder concentration of any of the other material mixture layers. Coating is preferably performed such that the thickness of the first material mixture layer 12 is equal to or less than the thickness of the second material mixture layer 13. If the material mixture layer has the multilayer structure of three or more layers, coating is preferably performed such that the thickness of the first material mixture layer 12 is equal to or less than the total thickness of the other material mixture layers. The coating method is not particularly limited, and for example, includes a method using a die coater D.

[First Drying Step]

The first drying step is the step of drying the first material mixture layer 12 coating the base material 11 in the first coating step. The method for drying the first material mixture layer 12 is not particularly limited, and an example includes a method using a well-known drying device H using, e.g., hot air, a heater, or far-infrared radiation.

[Second Coating Step]

The second coating step is the step of coating, with the second material mixture layer 13, a surface of the first material mixture layer 12 formed in the first coating step and the first drying step. The coating method in the second coating step is not particularly limited, and a method similar to that of the first coating step is used.

[Second Drying Step]

The second drying step is the step of drying the second material mixture layer 13 coating the first material mixture layer 12 in the second coating step. A drying method in the second drying step is not particularly limited, and a method similar to that of the first drying step is used.

According to the method for manufacturing the second battery electrode according to the present embodiment, the above-described secondary battery electrode can be manufactured. Two or more divided layers are stacked on each other to form the material mixture layer, and therefore, the time for drying the material mixture layer can be reduced and the time for manufacturing the secondary battery electrode can be shortened.

<Method for Manufacturing Solid-State Battery>

The method for manufacturing the solid-state battery according to the present embodiment has, for example, the arrangement step of arranging the sheet-shaped solid electrolyte layer between the positive electrode and the negative electrode as the above-described secondary battery electrodes and the joint step of joining these layers to each other. The joint method in the joint step is not particularly limited, and examples of the joint method include a method in which the layers are pressure-bonded to each other by pressurization, a method (roll to roll) in which the layers are pressurized through between two rolls, etc. In addition to the method described above, the method for manufacturing the solid-state battery according to the present embodiment includes a method in which the surfaces of the electrode material mixture layers of the positive and negative electrodes are directly coated with solid electrolyte slurry and the positive and negative electrodes coated with the solid electrolyte are subsequently stacked on each other to manufacture the solid-state battery.

Note that for the purpose of improving adhesion between the solid electrolyte layer and the positive electrode or the negative electrode, an active material having ionic conductivity or an adhesive substance not interfering with ionic conductivity may be arranged at a joint interface.

EXAMPLES

Next, examples of the present invention will be described, but the present invention is not limited to these examples.

Example 1

(Preparation of Electrode Material Mixture)

Graphite as a negative electrode active material, LPS-halogen as a solid electrolyte, and styrene-butadiene rubber as a binder were kneaded to prepare a first material mixture of Example 1. Next, a second material mixture of Example 1 was prepared using the same materials.

(Production of Negative Electrode)

A base material (CC-Cu foil) as a current collector was coated with the prepared first material mixture by means of a die coater, and then, the first material mixture was dried (a drying temperature of 40° C., a drying time of one minute). In this manner, a first material mixture layer (a first layer in Table 1) was formed to have a thickness of 18 μm after drying. Next, the first material mixture layer was coated with the prepared second material mixture such that the thickness after drying was 102 μm, and then, the second material mixture was dried (a drying temperature of 40° C., a drying time of 29 minutes). In this manner, a second material mixture layer (a second layer in Table 1) was formed.

Examples 2, 3 and Comparative Examples 1, 2

(Preparation of Electrode Material Mixture)

In other examples and comparative examples, the same first and second material mixtures as those of Example 1 were used for forming first and second material mixture layers. In Comparative Example 1, the first material mixture was not used, and only the second material mixture was used. In Comparative Example 2, the second material mixture, was not used, and only the first material mixture was used.

(Production of Negative Electrode)

Using the same base material and the same coating method as those of Example 1, negative electrodes according to Examples 2, 3 and Comparative Examples 1, 2 were produced. The thicknesses of the first and second layers after drying are as shown in Table 1. Drying conditions for each layer are as follows:

Example 2: the first layer (a drying temperature of 40° C., a drying time of 11 minutes), the second layer (a drying temperature of 40° C., a drying time of 19 minutes);

Example 3: the first layer (a drying temperature of 40° C., a drying time of 20 minutes), the second layer (a drying temperature of 40° C., a drying time of 10 minutes);

Comparative Example 1: the second layer (a drying temperature of 40° C., a drying time of 30 minutes); and Comparative Example 2: the first layer (a drying temperature of 40° C., a drying time of 30 minutes).

<Evaluation>

(Peel Strength Test)

Figure 5:
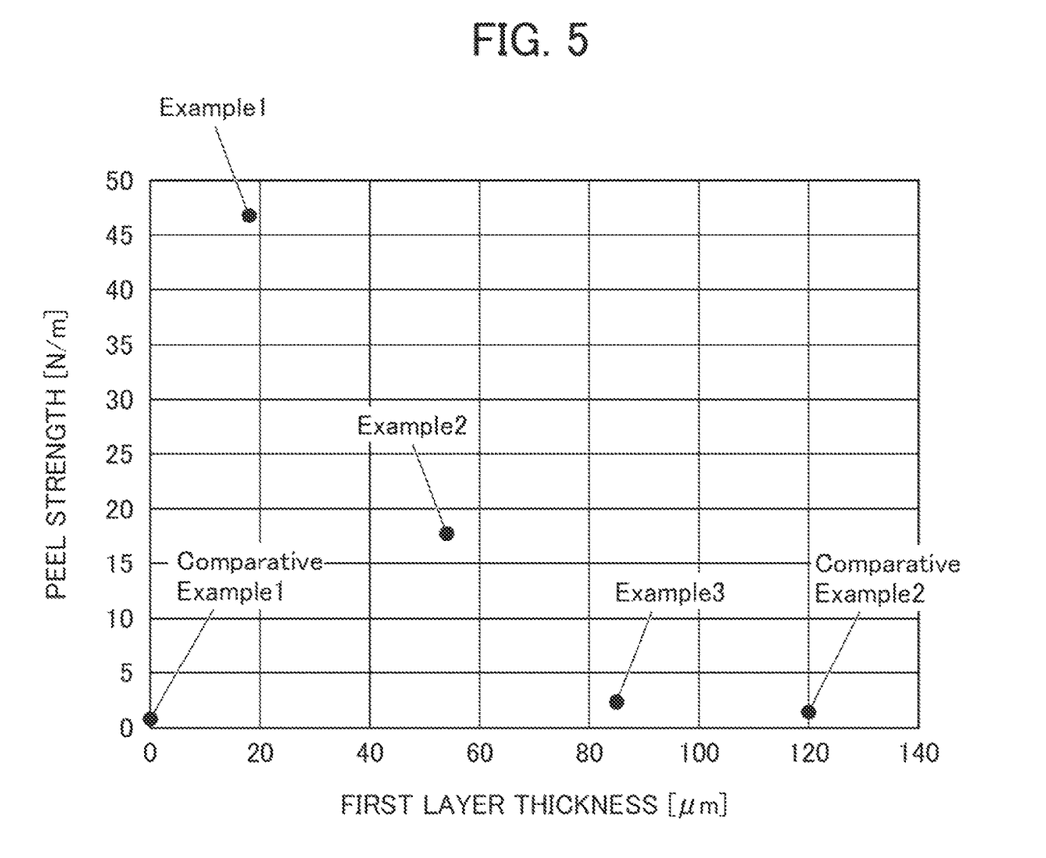
FIG. 5 is a graph showing a relationship between the thickness of a first layer of a secondary battery electrode and a peel strength in examples and comparative examples of the present invention.

Using the above-described produced negative electrodes according to the examples and the comparative examples as secondary battery electrodes, a peel strength test was conducted. A peel strength was measured using a force gauge (ZTA-2N manufactured by IMADA Co., Ltd.) and a measurement stand (MX2-500N manufactured by IMADA Co., Ltd.). Results are shown in Table 1. Moreover, a relationship between the peel strength (N/m) and the thickness (μm) of the first layer is shown in FIG. 5. Further, a peel state was visually observed, and is shown in Table 1.

"Interface" in Table 1 means that peel occurs at an interface between the base material and the material mixture layer. Similarly, "Aggregated" means that destruction occurs in the material mixture layer.

TABLE 1

|  |  | Example 1 | Example 2 | Example 3 | Comparative Example 1 | Comparative Example 2 |
|---|---|---|---|---|---|---|
| First Layer | Thickness [μm] | 18 | 54 | 85 | — | 120 |
| | Binder Concentration [wt %] | 5.5 | 5.5 | 5.5 | — | 5.5 |
| Second Layer | Thickness [μm] | 102 | 66 | 35 | 120 | — |
| | Binder Concentration [wt %] | 2.3 | 2.3 | 2.3 | 2.3 | — |
| Total | Thickness [μm] | 120 | 120 | 120 | 120 | 120 |
| | Estimated Binder Concentration [wt %] | 2.8 | 3.7 | 4.6 | 2.2 | 5.5 |
| | Peel Strength [N/m] | 46.8 | 17.8 | 2.4 | 0.8 | 1.4 |
| | Peel State | Aggregated | Interference | Interference | Interference | Interference |

The results shown in Table 1 and FIG. 5 show that the negative electrode of each example having the first material mixture layer and another material mixture layer and having a higher contained binder concentration in the first material mixture layer has a higher peel strength between the base material and the material mixture layer as compared to the negative electrodes according to the comparative examples. In comparison between Example 1 and Comparative Example 2, it is obvious that the peel strength is improved not by a mere increase in the binder concentration of the material mixture layer but by providing the first material mixture layer having a higher binder concentration. Further, the binder concentration across the entire material mixture layer can be also reduced in the negative electrode of Example 1, and therefore, the internal resistance of a battery to be formed can be reduced. In addition, a manufacturing time upon manufacturing of the secondary battery can be shortened. In comparison among Examples 1 to 3, it is obvious that the first material mixture layer thickness equal to or less than the total thickness of the other material mixture layers can further improve the peel strength and can reduce the binder concentration across the entire material mixture layer.

EXPLANATION OF REFERENCE NUMERALS

10 Solid-State Battery
1 Negative Electrode (Secondary Battery Electrode)
11 Base Material
12 First Material Mixture Layer
13 Second Material Mixture Layer
2 Positive Electrode (Secondary Battery Electrode)

What is claimed is:

1. A method for manufacturing a solid-state battery, the method comprising:
arranging a solid electrolyte layer between a positive electrode and a negative electrode; and
joining the solid electrolyte layer and the positive and negative electrodes to each other, wherein
a method for manufacturing the positive and negative electrodes comprises:
a first coating step of coating a surface of a base material with a first material mixture layer made of an electrode material mixture containing an active material and a binder;
a first drying step of drying the first material mixture layer by heating;
a second coating step of coating a surface of the first material mixture layer with a second material mixture layer made of an electrode material mixture containing an active material and a binder; and
a second drying step of drying the second material mixture layer by heating,
the first drying step and the second drying step are performed separately from each other,
the first material mixture layer and the second material mixture layer are respectively dried in the first drying step and the second drying step to an extent that migration of the binder is inhibited,
in the first drying step, a drying time is 1 minute or longer and 11 minutes or shorter,
the first material mixture layer has a thickness of 18 μm or more and 54 μm or less,
the second material mixture layer has a thickness of 66 μm or more and 102 μm or less,
the second material mixture layer has a binder concentration of 2.3 wt. % or more,
the first material mixture layer and the second material mixture layer form a material mixture layer that has a binder concentration of 2.8 wt. % or more and 3.7 wt. % or less, and a binder concentration of the first material mixture layer is higher than the binder concentration of the second material mixture layer.

* * * * *